2 Sheets—Sheet 1.

T. A. MACAULAY.

SEWING MACHINE.

No. 10,317. Reissued Apr. 24, 1883.

Witnesses:
Phil. C. Dieterich
Arthur E. Dowell

Inventor:
Thos. A. Macaulay

N. PETERS, Photo-Lithographer, Washington, D. C.

2 Sheets—Sheet 2.
T. A. MACAULAY.
SEWING MACHINE.
No. 10,317. Reissued Apr. 24, 1883.
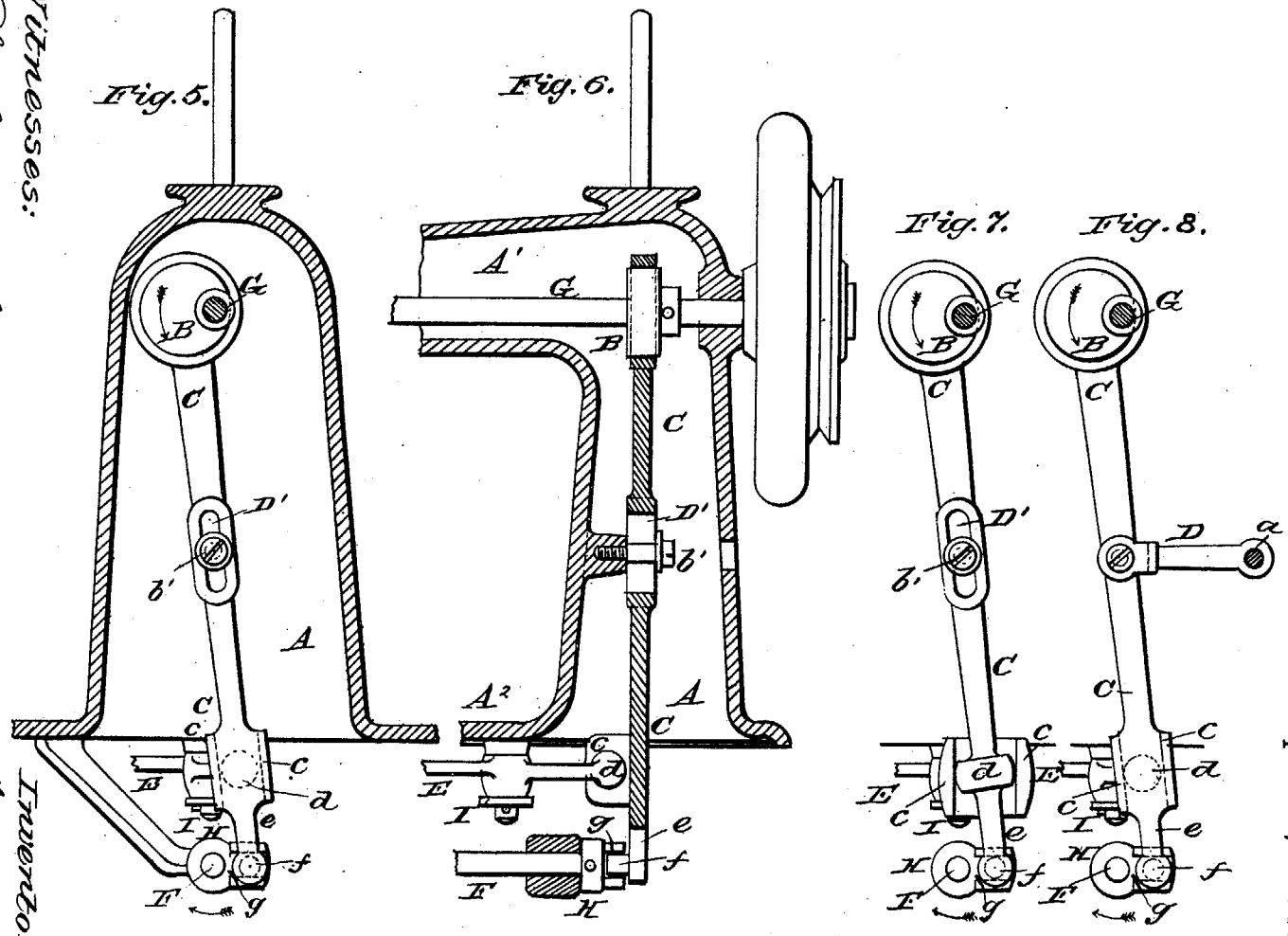
Witnesses:
Phil. C. Dietrich.
Arthur E. Dowell
Inventor:
Thos. A. Macaulay
N. PETERS, Photo-Lithographer, Washington, D. C.

BEST AVAILABLE COPY

UNITED STATES PATENT OFFICE.

THOMAS A. MACAULAY, OF NEW YORK, N. Y.

SEWING-MACHINE.

SPECIFICATION forming part of Reissued Letters Patent No. 10,317, dated April 24, 1883.

Original No. 185,399, dated December 19, 1876. Application for reissue filed March 27, 1883.

*To all whom it may concern:*

Be it known that I, THOMAS A. MACAULAY, of the city, county, and State of New York, have invented certain new and useful Improvements in Sewing-Machines, of which the following is a specification, reference being had to the accompanying drawings, forming part of the same.

The object of my invention is to provide simple and efficient mechanism for operating the shuttle and feed of a sewing-machine; and my invention consists in the combinations and arrangements of parts hereinafter described, and pointed out in the claims.

Figure 1:
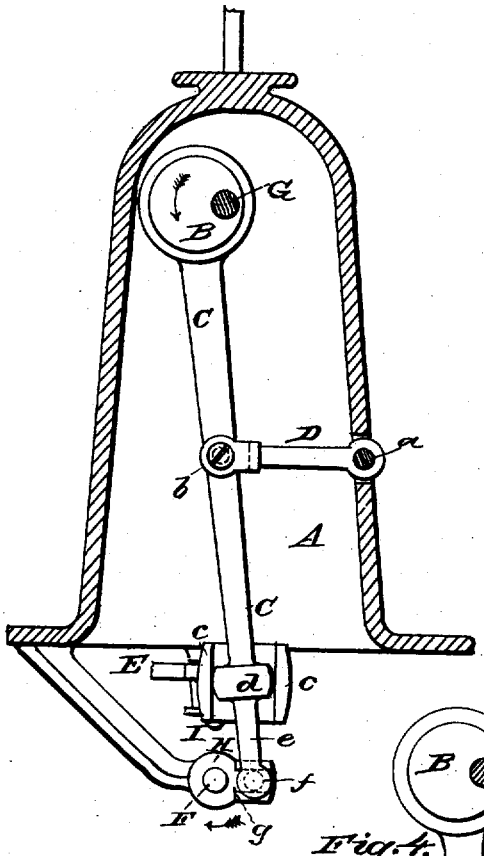
Figure 2:
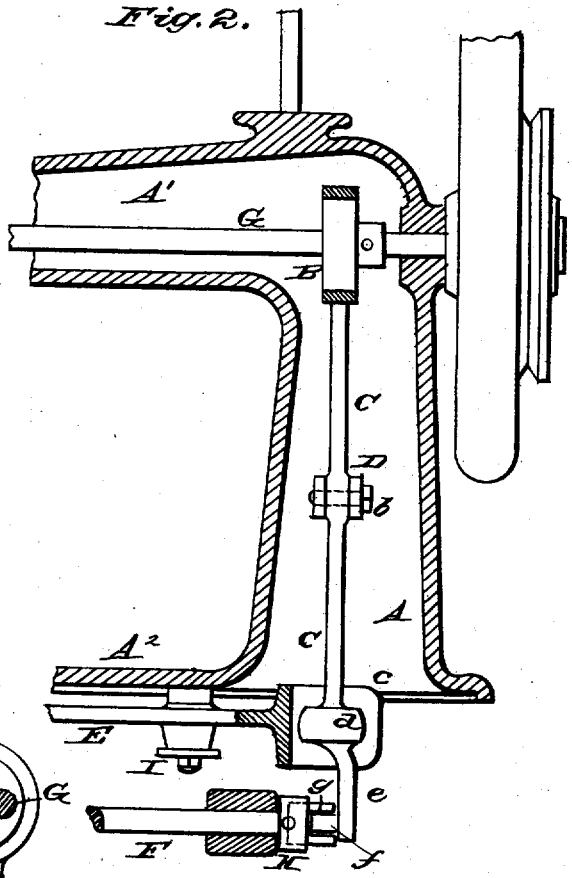
Figure 4:
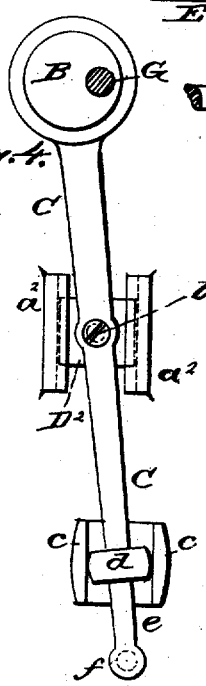
Figure 3:
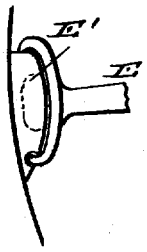
Figure 3:
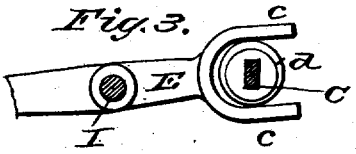

In the drawings, Figure 1 is a sectional rear end elevation of a portion of a sewing-machine embodying my invention. Fig. 2 is a sectional side elevation of the same. Fig. 3 is a plan of the shuttle-carrier and shuttle-lever, showing the connection of the latter with its operating-lever. Figs. 4, 7, and 8 are end elevations, without the frame of the machine, of modified forms of construction; and Figs. 5 and 6 are views similar to Figs. 1 and 2 of other modifications.

Similar letters refer to like parts in all the figures.

A A′ is the bracket-arm of the machine, formed integral with or suitably secured to the bed-plate $A^2$ in the usual manner.

G is the main shaft, mounted in the horizontal portion of the bracket-arm above the bed-plate, and provided at its front end with the usual crank for operating the needle-bar in the usual manner of this class of sewing-machines.

B is an eccentric secured to the main shaft G near the intersection of the vertical and horizontal parts of the bracket-arm A A′.

C is a lever arranged in the vertical part of the bracket-arm, and extending beneath the bed-plate, said lever being connected at its upper end to the eccentric B by an eccentric-strap in a customary manner, and at its lower end to a slotted crank, H, on the shaft F by a pin, *f*, on an extension, *e*, engaging in the slot *g* of the crank H.

D is a radius-bar, pivoted to the hollow bracket-arm by a pin, *a*, and to the lever C by a pin, *b*.

E is a shuttle-driving lever, pivoted to the bed-plate, in the usual manner, by a stud, I, and having a shuttle-carrier of the usual construction at its front end, carrying a shuttle, E′. The rear end of said shuttle-lever E is forked and connected to the operating-lever C by ball *d*, engaging in the fork *c c* of the lever E. The lever C is shown slotted in Figs. 5, 6, and 7, and operating on a fixed pin, *b′*. Such a slot and pin is a well-known equivalent for a radius-bar for such a purpose. In Fig. 4 the lever is shown connected by pin $b^2$ to a sliding block, $D^2$, operating in guides $a^2$ $a^2$. Said sliding block and guides also constitute a well-known equivalent for a slot and pin or a radius-bar. In Figs. 5, 6, and 8 the shuttle-carrying lever E is shown having a ball at its rear end engaging in a slot in the operating-lever C, this being an equivalent for the forked shuttle-lever and ball on the end of operating-lever.

F is a revolving feed-operating shaft, supported in brackets projecting from the under side of the bed-plate, said shaft being provided with a slotted crank, H, which embraces a pin, *f*, carried by an extension, *e*, of the lever C. The feed-shaft F is provided with any suitable means for operating the feed-bar of the machine.

The operation of the mechanism above described is as follows: Motion being given to the machine by the rotation of the main shaft G and its eccentric B, a vertical and vibratory motion is imparted to the lever C by reason of the operation of the eccentric B in the upper end of the lever C, and by reason of the said lever C being connected to the radius-bar D or its equivalent above described said lever has imparted to its lower end, *e*, a corresponding vertical and vibratory motion, which, at the point where the pin *f* is secured to it, results in an elliptic curve around the center of the shaft F, and the pin *f* engaging in the slot *g* of the crank H on the shaft F imparts to said shaft F a rotating motion in equal time with the main driving-shaft G, but in an opposite direction. The shuttle-driving lever E receives its motion from the ball *d* of the lever C, operating in the forked end of the lever E.

It will be observed that the rotation of the feed-shaft F and the movement of the shuttle-driving lever E are produced independently of each other, though said shaft and lever receive their movement from a common driving-shaft and through a common transmitting-lever, and from a common eccentric on the main shaft.

I am aware that prior to my invention sewing-machines have been constructed in which a transmitting-lever was employed to communicate motion from a driving-shaft arranged above the bed-plate of the machine to a feed-shaft and shuttle-operating mechanism arranged beneath the bed-plate, as in the machine shown in United States Patent No. 42,288, to W. O. Grover; but in such machine the shuttle-operating mechanism was operated from a cam on the feed-shaft, and said shuttle mechanism and feed-shaft did not operate independently of each other, as in my machine. As a consequence of the construction shown in said patent to Grover, the friction on said shaft was so great that its connection with the transmitting-lever soon became worn and loose, and the proper operation of the machine was therefore of comparatively short duration by reason of the parts being "out of time." This difficulty, which prevented the extensive use of the class of machines above referred to, is overcome by my arrangement and combination, in which the shuttle-driving mechanism and feed-shaft operate independently of each other, as above described.

It will be observed that in my combination of the pin *f*, operating in the slot *g*, only the friction of the feed-shaft and feed-operating mechanism to overcome has to be overcome, while in the Grover patent referred to the corresponding pin in the end of the transmitting-lever, in addition to the friction of the feed-shaft and feed-operating mechanism, had to overcome the friction of the shuttle-operating mechanism, which received its motion from the said feed-operating shaft.

I am also aware that sewing-machines have heretofore been constructed in which a main shaft above the bed-plate communicated motion through mechanism arranged in the vertical portion of the bracket-arm to a rotary feed-shaft and vibrating shuttle-lever arranged beneath the bed-plate, as in patent to W. A. Mack, No. 38,592; but in such machine the feed-shaft received an intermittent rotary motion suitable only for operating a wheel-feed. Such construction was not adapted for the operation of a four-motion feed-bar, as is a feed-shaft rotating in equal time with the main driving-shaft, such as shown and described in the foregoing specification.

Having thus described my invention, what I claim, and desire to secure by Letters Patent, is—

1. The combination, in a sewing-machine, of a main shaft, a feed-shaft rotating coincidently therewith and oppositely thereto, a vibrating shuttle-carrier operating independently of said feed-shaft, and intermediate connecting mechanism for transmitting motion from said main shaft to said feed-shaft and shuttle-carrier, substantially as described.

2. The combination, in a sewing-machine, of a main shaft, a feed-shaft rotating coincidently therewith and oppositely thereto, a vibrating shuttle-carrier and shuttle-lever operating independently of said feed-shaft, and intermediate connecting mechanism for transmitting motion from said main shaft to said feed-shaft and shuttle-lever, substantially as set forth.

3. The combination, in a sewing-machine, of a main shaft arranged above the bed-plate, a feed-shaft rotating coincidently with said main shaft and arranged beneath the bed-plate, a vibrating shuttle-lever and shuttle-carrier also arranged beneath the bed-plate and operating independently of said feed-shaft, and intermediate connecting mechanism for transmitting motion from said main shaft to said feed-shaft and shuttle-carrier, substantially as described.

4. The combination, in a sewing-machine, of a bracket-arm, a main shaft arranged above the bed-plate in the horizontal portion of said arm, a feed-shaft rotating coincidently with said main shaft and arranged beneath the bed-plate, a shuttle-carrier operating independently of said feed-shaft, and intermediate connecting mechanism for transmitting motion from said main shaft to said feed-shaft and shuttle-carrier, substantially as set forth.

5. The combination, in a sewing-machine, of a main shaft, an eccentric thereon, a feed-shaft rotating coincidently with said main shaft, a shuttle-lever operating independently of said feed-shaft, and a transmitting-lever for communicating motion from said main shaft to said feed-shaft and shuttle-lever, substantially as set forth.

6. The combination, in a sewing-machine, of a bracket-arm, a main shaft arranged above the bed-plate in the horizontal portion of said arm and having an eccentric thereon, a feed-shaft rotating coincidently with said main shaft and arranged beneath the bed-plate, a shuttle-lever operating independently of said feed-shaft and also arranged beneath the bed-plate, and a transmitting-lever arranged in the vertical portion of said arm and extending beneath the same for communicating motion from said main shaft to said feed-shaft and shuttle-lever, substantially as set forth.

7. The combination, with the main shaft G, of the eccentric B, lever C, radius-bar D, or its equivalent, and the shuttle-lever E, the said lever C being jointed to the shuttle-lever, substantially as set forth.

8. The combination of the lever C, the radius-bar D, or its equivalent, and the shuttle-lever E, the said lever C being jointed directly to the shuttle-lever, whereby a vibratory motion is imparted to said shuttle-lever, substantially as set forth.

9. The combination of the main shaft G, eccentric B, the lever C, the radius-bar D, or its equivalent, the shuttle-lever E, and the feed-shaft F, the said lever C being jointed directly to the shuttle-lever and the feed-shaft, whereby a rotary motion of the main shaft imparts an equal and appropriate rotary motion to the feed-shaft and a vibrating motion to the shuttle-lever, as set forth.

10. The combination, in a sewing-machine, of a bracket-arm, a main shaft, an eccentric thereon, a shuttle-lever, a feed-shaft, and a transmitting-lever adapted to operate said shuttle-lever and having an extension adapted to operate said feed-shaft, substantially as described.

11. The combination, in a sewing-machine, of a main shaft, an eccentric thereon, a feed-shaft rotating coincidently with said main shaft, a shuttle-lever operating independently of said shaft, and transmitting mechanism receiving motion from said eccentric and communicating the same to said feed-shaft and shuttle-lever, as set forth.

THOS. A. MACAULAY.

Witnesses:
E. B. STOCKING,
SAML. K. BAYLEY.